US012730023B2

(12) United States Patent
Nawaoka et al.

(10) Patent No.: US 12,730,023 B2

(45) Date of Patent: Sep. 8, 2026

(54) DISTORTION RESISTANCE FILM AND PRESSURE SENSOR

(71) Applicant: TDK CORPORATION, Tokyo (JP)

(72) Inventors: Kohei Nawaoka, Tokyo (JP); Ken Unno, Tokyo (JP); Tetsuya Sasahara, Tokyo (JP); Masanori Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 169 days.

(21) Appl. No.: 18/284,242

(22) PCT Filed: Mar. 17, 2022

(86) PCT No.: PCT/JP2022/012333

§ 371 (c)(1),
(2) Date: Sep. 26, 2023

(87) PCT Pub. No.: WO2022/209963

PCT Pub. Date: Oct. 6, 2022

(65) Prior Publication Data

US 2024/0175773 A1 May 30, 2024

(30) Foreign Application Priority Data

Mar. 31, 2021 (JP) ................................ 2021-061014

(51) Int. Cl.
*G01L 9/00* (2006.01)

(52) U.S. Cl.
CPC .................................. *G01L 9/0051* (2013.01)

(58) Field of Classification Search
None
See application file for complete search history.

(56) References Cited

U.S. PATENT DOCUMENTS

2016/0320251 A1* 11/2016 Kieffer .................... G01K 7/18

FOREIGN PATENT DOCUMENTS

| | | | | |
|---|---|---|---|---|
| CN | 101033539 | A | * | 9/2007 |
| CN | 104797734 | A | | 7/2015 |
| JP | 2015-031633 | A | | 2/2015 |
| JP | 2018059146 | A | * | 4/2018 |
| JP | 2018-091848 | A | | 6/2018 |
| JP | 2019-192740 | A | | 10/2019 |

OTHER PUBLICATIONS

Jun. 7, 2022 International Search Report issued in International Patent Application No. PCT/JP2022/012333.

(Continued)

*Primary Examiner* — Peter J Macchiarolo
*Assistant Examiner* — Jermaine L Jenkins
(74) *Attorney, Agent, or Firm* — Oliff PLC

(57) ABSTRACT

A distortion resistance film is capable of reducing a property change accompanying a composition change and a pressure sensor uses the distortion resistance film. The distortion resistance film is represented by a formula $Cr_{100-x-y}Al_xN_y$, in which composition regions of x and y satisfy 25<x≤50 and 0.1<y≤20, respectively.

8 Claims, 5 Drawing Sheets

(56) References Cited

OTHER PUBLICATIONS

Ozawa, P. Juichiro, et al. "Electrical Properties of Cr—Al Alloy Thin Films". IEEE Transactions on Components, Hybrids, and Manufacturing Technology, vol. CHMT-9, No. 4, Dec. 1986, pp. 391-395.

Oct. 3, 2023 International Preliminary Report on Patentability issued in International Patent Application No. PCT/JP2022/012333.

Feb. 7, 2025 extended Search Report issued in European Patent Application No. 22780182.6.

Translation of Mar. 1, 2026 Office Action issued in Chinese Application No. 202280024663.X.

* cited by examiner

TCR 2000
1500
1000
500
0
-500
-1000
-1500
-2000

0 10 20 30 40 50

Al composition (at%)

DISTORTION RESISTANCE FILM AND PRESSURE SENSOR

TECHNICAL FIELD

The present invention relates to a distortion resistance film whose resistance value changes according to distortion, and a pressure sensor using the same.

BACKGROUND ART

It has been reported that a material containing Cr, Al, and N exhibits a high gauge factor at −50° C. to 300° C. including a relatively high temperature region, and is promising as a distortion resistance film. In particular, Patent Literature 1 reports that when a composition range of Al is 4 at % or more and 25 at % or less, such a distortion resistance film can obtain a preferable property not only for the gauge factor but also for a temperature coefficient of sensitivity (TCS).

On the other hand, a distortion resistance film containing Cr, Al, and N can be produced by a thin film method or the like, but it is not easy to reduce composition variation in such a distortion resistance film. In other words, if an appropriate composition range that allows a certain degree of composition variation can be found, a distortion resistance film having good productivity can be realized. Furthermore, at the same time, in a case where the distortion resistance film has high linearity in a relationship between a temperature and a resistance value, a temperature property of the distortion resistance film can be calibrated in a low temperature region, so that productivity can be improved by shortening the configuration time.

CITATION LIST

Patent Literature

Patent Literature 1: JP 2018-91848 A

SUMMARY OF INVENTION

Technical Problem

Under such circumstances, the inventors of the present invention have found a distortion resistance film capable of reducing a property change accompanying a composition change in a material containing Cr, Al, and N, and have completed the present invention.

The present invention has been made in view of such actual circumstances, and an object of the present invention is to provide a distortion resistance film capable of reducing a property change accompanying a composition change, and a pressure sensor using the distortion resistance film.

Solution to Problem

A distortion resistance film according to the present invention comprises a composition represented by a formula $Cr_{100-x-y}Al_xN_y$, wherein composition regions of x and y satisfy $25<x\leq50$ and $0.1<y\leq20$, respectively.

In the distortion resistance film comprises the composition represented by the formula $Cr_{100-x-y}Al_xN_y$, it has been found that when $25<x\leq50$ and $0.1<y\leq20$, the distortion resistance film according to the present invention can reduce a property change accompanying a composition change, and at the same time, has linearity in which a relationship of a resistance value with respect to a temperature is very good. In particular, by increasing an amount of Al as compared with the related-art distortion resistance film, the property change accompanying the composition change can be reduced as compared with the related-art distortion resistance film. Furthermore, such a distortion resistance film can tolerate composition variation during manufacturing within an appropriate range, and has good productivity. Moreover, due to the good linearity of the latter, it is possible to quickly calibrate a temperature resistance property of the distortion resistance film in a low temperature region, and thus, it is possible to simultaneously obtain an improvement in productivity by shortening the calibration time.

Furthermore, for example, in the distortion resistance film according to the present invention, an absolute value of a temperature coefficient of resistance (TCR) may be 2000 ppm/° C. or less in a temperature range of −50° C. or more and 450° C. or less.

Such a distortion resistance film has a resistance value change per unit temperature change within a predetermined range, and thus can reduce a temperature correction error when used as, for example, a pressure sensor.

Furthermore, for example, in the distortion resistance film according to the present invention, an absolute value of a temperature coefficient of sensitivity (TCS) mat be 2000 ppm/° C. or less in a temperature range of −50° C. or more and 450° C. or less.

Such a distortion resistance film has a sensitivity change per unit temperature change within a predetermined range, and thus can reduce a temperature correction error when used as, for example, a pressure sensor.

Furthermore, for example, in the distortion resistance film according to the present invention, O may be contained in an amount of 10 at % or less with respect to a total amount of Cr, Al, N, and O.

When O is 10 at % or less, the gauge factor can be increased, for example, in a temperature range of −50° C. or more and 450° C. or less.

A pressure sensor according to the present invention includes any one of the distortion resistance films described above, and an electrode portion electrically connected to the distortion resistance film.

Furthermore, for example, in a case where a temperature calibration of the resistance value is performed in a low temperature region, a relationship between a temperature calibration straight line of a resistance value and a resistance temperature straight line of the distortion resistance film may be 0.8 or more in a coefficient $R^2$ of determination.

Such a distortion resistance film has a particularly good linearity in a relationship in the resistance value with respect to temperature, and thus the temperature resistance property can be accurately and quickly calibrated.

The pressure sensor according to the present invention has the distortion resistance film in which a property change accompanying a composition change is reduced as compared with a related-art distortion resistance film, and thus has good productivity. Furthermore, since the property variation of the distortion resistance film is suppressed, it is possible to obtain a more accurate pressure detected value than before.

BRIEF DESCRIPTION OF DRAWINGS

FIG. 2 is an enlarged cross-sectional view of a portion indicated by II in FIG. 1.

FIG. 3 is a conceptual diagram illustrating a distortion resistance film according to an example.

FIG. 4 is a graph illustrating a relationship between an Al amount and a TCR.

DESCRIPTION OF EMBODIMENTS

Figure 1:
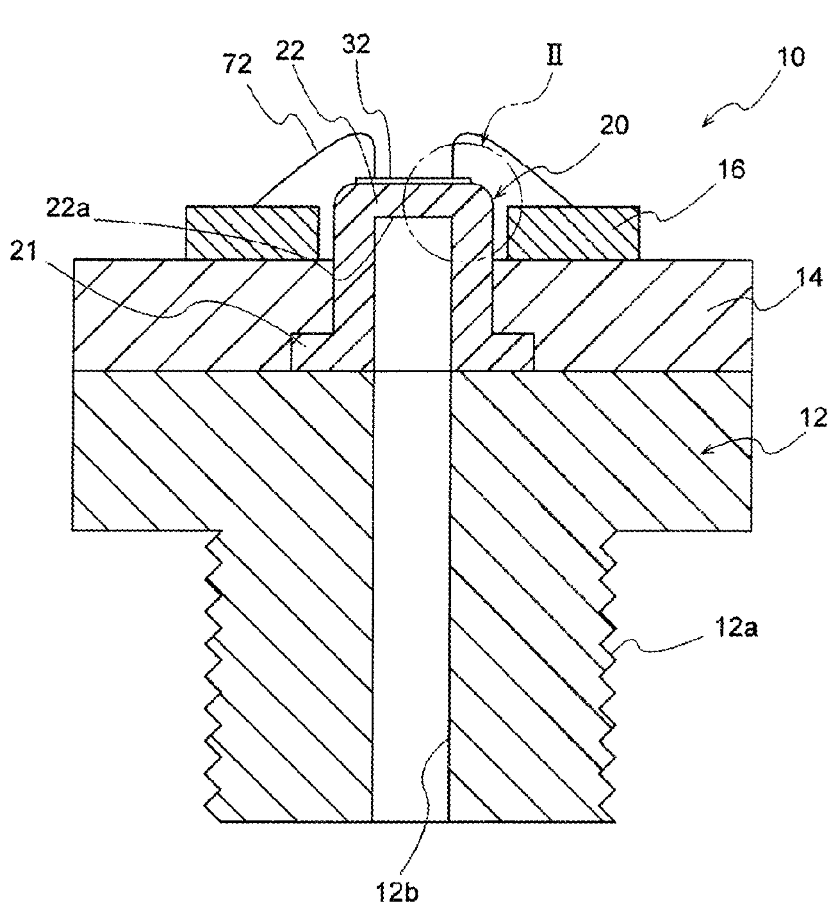
FIG. 1 is a schematic cross-sectional view of a pressure sensor according to an embodiment of the present invention.

Hereinafter, the present invention will be described based on embodiments illustrated in the drawings.

FIG. 1 is a schematic cross-sectional view of a pressure sensor 10 using a distortion resistance film 32 according to an embodiment of the present invention. As illustrated in FIG. 1, the pressure sensor 10 includes a membrane 22 that deforms according to pressure. In FIG. 1, the membrane 22 is constituted by an end wall formed at one end of a hollow cylindrical stem 20, but may be constituted by a tabular Si substrate 122 (see FIG. 3) as in the embodiment. The other end of the stem 20 is an open end of a hollow portion, and the hollow portion of the stem 20 communicates with a flow path 12*b* of a connection member 12.

In the pressure sensor 10, a fluid introduced into the flow path 12*b* is guided from the hollow portion of the stem 20 to an inner surface 22*a* of the membrane 22, and a fluid pressure acts on the membrane 22. The stem 20 is made of metal such as stainless steel. However, the shape corresponding to the stem 20 may be configured by processing a silicon substrate by etching, or by bonding a tabular silicon substrate to another material.

A flange portion 21 is formed around the open end of the stem 20 so as to protrude outward from an axis of the stem 20. The flange portion 21 is sandwiched between the connection member 12 and a pressing member 14 so that the flow path 12*b* leading to the inner surface 22*a* of the membrane 22 is sealed.

The connection member 12 includes a screw groove 12*a* for fixing the pressure sensor 10. The pressure sensor 10 is fixed via the screw groove 12*a* to a pressure chamber or the like in which a fluid to be measured is sealed. As a result, the flow path 12*b* formed inside the connection member 12 and the inner surface 22*a* of the membrane 22 in the stem 20 communicate airtightly with the pressure chamber in which the fluid to be measured exists.

A circuit substrate 16 is attached to an upper surface of the pressing member 14. The circuit substrate 16 has a ring shape surrounding a periphery of the stem 20, but the shape of the circuit substrate 16 is not limited thereto. The circuit substrate 16 incorporates, for example, a circuit or the like to which a detection signal from the distortion resistance film 32 is transmitted.

As illustrated in FIG. 1, the distortion resistance film 32 and the like are provided on an outer surface 22*b* of the membrane 22. The distortion resistance film 32 and the circuit substrate 16 are electrically connected to each other through an intermediate wiring 72 formed by wire bonding or the like.

Figure 2:
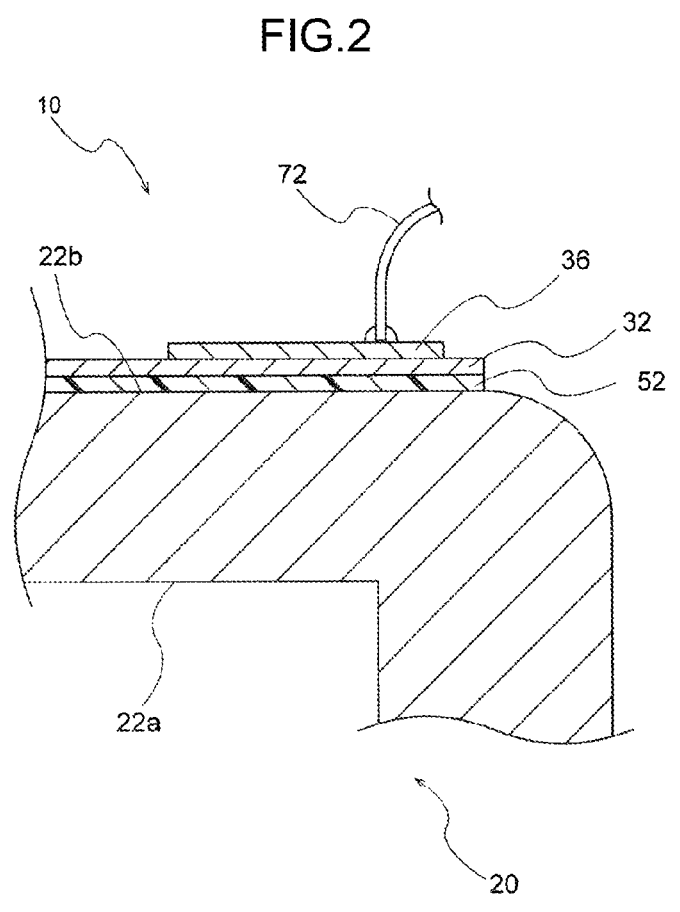

FIG. 2 is a schematic cross-sectional view illustrating a part of the distortion resistance film 32 included in the pressure sensor 10 illustrated in FIG. 1 and its peripheral portion in an enlarged manner.

As illustrated in FIG. 2, the distortion resistance film 32 is provided on the outer surface 22*b* of the membrane 22 via a base insulating layer 52.

The base insulating layer 52 is formed so as to cover substantially the entire outer surface 22*b* of the membrane 22, and is made of, for example, silicon oxide such as $SiO_2$, silicon nitride, silicon oxynitride, or the like. A thickness of the base insulating layer 52 is preferably 10 μm or less, and more preferably 1 to 5 μm. The base insulating layer 52 can be formed on the outer surface 22*b* of the membrane 22 by a vapor deposition method such as CVD.

Note that, in a case where the outer surface 22*b* of the membrane 22 has insulating properties, the distortion resistance film 32 may be formed directly on the outer surface 22*b* of the membrane 22 without forming the base insulating layer 52. For example, in a case where the membrane 22 is made of an insulating material such as alumina, the distortion resistance film 32 may be directly provided on the membrane 22.

As illustrated in FIG. 2, an electrode portion 36 is provided on the distortion resistance film 32. Although not illustrated, in the distortion resistance film 32, for example, resistors constituting a wheatstone bridge circuit are formed in a predetermined pattern. Since a resistance value of the resistor formed in the distortion resistance film 32 changes according to deformation of the membrane 22, the distortion generated in the membrane 22 and the fluid pressure acting on the membrane 22 are detected from an output of the wheatstone bridge circuit. The distortion resistance film 32 including the resistor can be produced by microfabricating (patterning) a thin film formed to have a predetermined thickness.

Here, the distortion resistance film 32 comprises a composition represented by a formula $Cr_{100-x-y}Al_xN_y$, and composition regions of x and y satisfy $25<x\leq 50$ and $0.1<y\leq 20$, respectively. The present inventors have found that when distortion resistance film 32 has such a composition, a change in property associated with a change in composition can be reduced. In particular, by setting an amount of N to be in a predetermined range and then setting an amount of Al to be more than 25% in terms of atomic ratio, the property change accompanying the composition change can be reduced as compared with the related-art distortion resistance film (see FIG. 4). Therefore, such a distortion resistance film 32 can tolerate composition variation during manufacturing within an appropriate range, and has good productivity.

Figure 5:
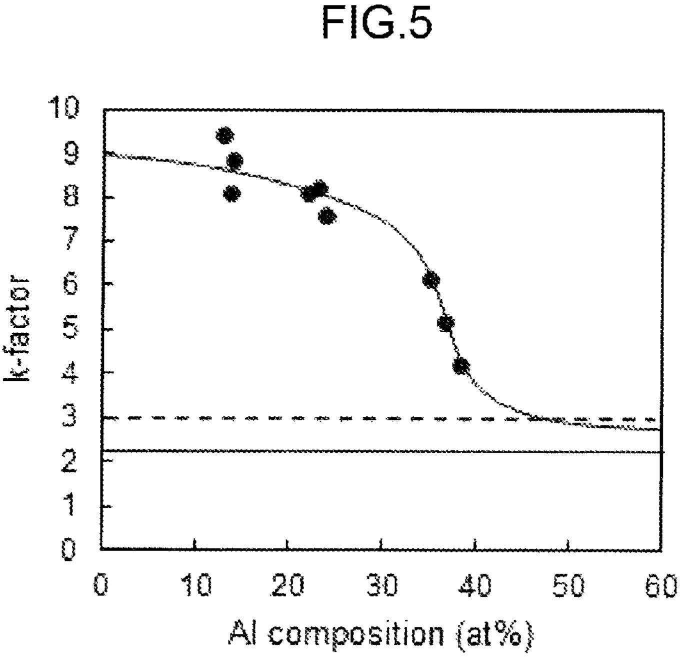
FIG. 5 is a graph illustrating a relationship between an Al amount and a gauge factor.

Furthermore, the distortion resistance film 32 can secure an appropriate gauge factor by setting the amount of Al to 50% or less in terms of atomic ratio after setting the amount of N to a predetermined range (see FIG. 5).

Furthermore, the distortion resistance film 32 may have an absolute value of a temperature coefficient of resistance (TCR) of 2000 ppm/° C. or less in a temperature range of −50° C. or more and 450° C. or less. Since such a distortion resistance film 32 has a small proportion of a resistance value change accompanying a temperature change in a wide range from a low temperature region to a high temperature region, the distortion resistance film is suitably used as the distortion resistance film 32 of the pressure sensor 10 used in a wide temperature range, and can reduce a temperature correction error and perform highly accurate detection.

Furthermore, the distortion resistance film 32 may have an absolute value of a temperature coefficient of sensitivity (TCS) of 2000 ppm/° C. or less in a temperature range of −50° C. or more and 450° C. or less. Since such a distortion resistance film 32 has a small proportion of a sensitivity change accompanying a temperature change in a wide range from a low temperature region to a high temperature region, the distortion resistance film is suitably used as the distortion resistance film 32 of the pressure sensor 10 used in a wide temperature range, and can reduce a temperature correction error and perform highly accurate detection.

Furthermore, the distortion resistance film 32 may contain O as an inevitable impurity in an amount of 10 at % or less with respect to a total amount of Cr, Al, N, and O. When O as an inevitable impurity is 10 at % or less, the distortion resistance film 32 can increase the gauge factor in a temperature range of, for example, −50° C. or more and 450° C. or less.

The distortion resistance film 32 can be formed by a thin film method such as sputtering or vapor deposition by a DC sputtering device or an RF sputtering device. A thickness of the distortion resistance film 32 is not particularly limited, but can be, for example, 1 nm to 1000 nm, and is preferably about 50 nm to 500 nm. O and N contained in the distortion resistance film 32 may be those remaining without being removed from a reaction chamber when the distortion resistance film 32 is formed, and may be taken into the distortion resistance film 32. Furthermore, O and N contained in the distortion resistance film 32 may be introduced into the distortion resistance film 32 while intentionally controlling an introduction amount by being used as an atmospheric gas during film formation or annealing.

The distortion resistance film 32 may contain a metal other than Cr and Al or a nonmetallic element in a small amount. Examples of metals other than Cr and Al, and non-metal elements contained in the distortion resistance film 32 include Ti, Nb, Ta, Ni, Zr, Hf, Si, Ge, C, P, Se, Te, Zn, Cu, Bi, Fe, Mo, W, As, Sn, Sb, Pb, B, Ge, In, Ti, Ru, Rh, Re, Os, Ir, Pt, Pd, Ag, Au, Co, Be, Mg, Ca, Sr, Ba, Mn, and rare earth elements. Note that, in the distortion resistance film 32, property such as a gauge factor, a temperature coefficient of sensitivity, and a temperature coefficient of resistance may change depending on the presence or absence of these trace elements and a heat treatment condition such as annealing.

A heat treatment temperature at the time of manufacturing the distortion resistance film 32 is not particularly limited, and may be, for example, 50° C. to 550° C., and is preferably 350° C. to 550° C.

As illustrated in FIG. 2, the electrode portion 36 is provided to overlap the distortion resistance film 32, and is electrically connected to the distortion resistance film 32. As illustrated in FIG. 2, the electrode portion 36 is formed on a part of an upper surface of the distortion resistance film 32. An output of the wheatstone bridge circuit included in the distortion resistance film 32 is transmitted to the circuit substrate 16 illustrated in FIG. 1 via the electrode portion 36 and the intermediate wiring 72. Examples of a material of the electrode portion 36 include a conductive metal or alloy, and more specifically include Cr, Ti, Ni, Mo, a platinum group element, and the like. Furthermore, the electrode portion 36 may have a multilayer structure with different materials.

The base insulating layer 52 and the electrode portion 36 illustrated in FIG. 2 can also be formed by a thin film method such as sputtering or vapor deposition, similarly to the distortion resistance film 32. However, the base insulating layer 52 and the electrode portion 36 may be formed by a method other than the thin film method, and for example, the base insulating layer 52 made of a $SiO_2$ film may be provided on a Si substrate surface by heating the Si substrate surface to form a thermal oxide film.

Hereinafter, the distortion resistance film and the pressure sensor according to the present invention will be described in more detail with reference to Examples, but the present invention is not limited to only these Examples.

Example 1

As Example 1, eight samples (samples 1 to 8) having different Al (values of x) were prepared for the distortion resistance film comprises a composition represented by the formula $Cr_{100-x-y}Al_xN_y$. For each of the prepared samples, composition analysis, measurement of a temperature coefficient of resistance (TCR), and measurement of a temperature coefficient of sensitivity (TCS) were performed.

Sample Preparation

Figure 3:
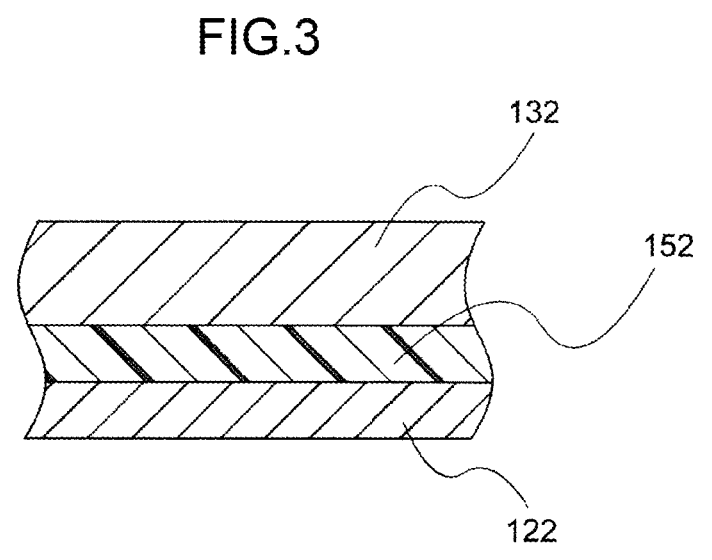

FIG. 3 is a schematic diagram illustrating a structure of the samples (samples 1 to 8) prepared in Example 1. In Example 1, the Si substrate 122 was heated to form a $SiO_2$ film 152, which was a thermal oxide film, on a surface of the Si substrate 122, and then a distortion resistance film 132 was formed on a surface of the $SiO_2$ film 152 using a DC sputtering device. Moreover, the distortion resistance film 132 after film formation was annealed (heat-treated) at 350° C., and then a resistor constituting a wheatstone bridge circuit was formed in the distortion resistance film 132 by microfabrication. Finally, an electrode layer was formed on a surface of the distortion resistance film 132 by electron vapor deposition to obtain a sample for measurement of the temperature coefficient of resistance (TCR) and the temperature coefficient of sensitivity (TCS).

In the film formation of the distortion resistance film 132 in each sample, eight samples having different Al amounts (values of x) were prepared by changing the number of Cr targets and Al targets used in the DC sputtering device and a potential of each target. The sputtering was performed in an atmosphere of Ar gas and a small amount of N gas. Furthermore, a film thickness of the distortion resistance film 132 was 300 nm.

Composition Analysis

For Samples 1 to 8, the composition of the distortion resistance film 132 was analyzed by an XRF (fluorescent X-ray) method.

Measurement of Temperature Coefficient of Resistance (TCR)

For each sample (Samples 1 to 8), a resistance value was measured while changing an environmental temperature from −50° C. to 450° C., a relationship between the resistance value and the temperature for each sample was subjected to straight line approximation by a method of least squares to obtain a slope, and the TCR (ppm/° C.) was calculated from the slope. A calculated reference temperature of the TCR is 25° C.

Quantitative Evaluation of Linearity

For each sample (Samples 1 to 8), the resistance value was measured while changing the environmental temperature from −50° C. to 450° C., a temperature calibration straight line ($R_{Cal}$) of the resistance value was calculated at two points in a low temperature region of 25° C. and 100° C., and a coefficient $R^2$ of determination indicating a relationship with a resistance temperature straight line ($R_{Meas}$) of the distortion resistance film was calculated by the following Formula (1).

Mathematical Formula 1

$$R^2 = I - \sum_{i=0}^{N} (R_{Cal}(i) - R_{Meas}(i))^2 / \sum_{i=1}^{N} (R_{Meas}(i) - \overline{R}_{Meas})^2 \quad \text{Formula (1)}$$

N: Number of measurement data, i: Each measurement point $\overline{R}_{Meas}$: Average value of resistance temperature straight line from −50° C. to 400° c.

Measurement of Temperature Coefficient of Sensitivity (TCS)

For each sample (Samples 1 to 8), the gauge factor (k-factor) was measured while changing the environmental temperature from −50° C. to 450° C., a relationship between the gauge factor and the temperature for each sample was subjected to straight line approximation by the method of least squares to obtain a slope, and the TCS (ppm/° C.) was calculated from the slope. A calculated reference temperature of TCS is 25° C.

The composition analysis results, the coefficient $R^2$ of determination, and measurement results of the temperature coefficient of resistance (TCR) and the temperature coefficient of sensitivity (TCS) of each sample are shown in Table 1.

TABLE 1

| | Distortion resistance film composition (at %) | | | | | Linearity | Slope of | |
|---|---|---|---|---|---|---|---|---|
| | Cr | Al | O | N | TCR | $R^2$ | TCR | TCS |
| Sample 1 | 99.3 | 0 | 0.4 | 0.3 | 970 | 0.955 | −105 | −850 |
| Sample 2 | 91.5 | 6.3 | 0.5 | 1.7 | 571 | −3.794 | | 6650 |
| Sample 3 | 74.8 | 13.9 | 0.4 | 10.9 | −532 | 0.955 | | 1140 |
| Sample 4 | 67.6 | 22.3 | 0.3 | 9.8 | −1445 | 0.990 | | 911 |
| Sample 5 | 63.3 | 25.7 | 1.1 | 9.9 | −1528 | 0.983 | 16 | 1620 |
| Sample 6 | 62.3 | 32.8 | 0.5 | 4.4 | −1493 | 0.990 | | 1130 |
| Sample 7 | 54.6 | 34.8 | 0.8 | 9.8 | −1393 | 0.946 | | 640 |
| Sample 8 | 52.4 | 46.2 | 0.2 | 1.2 | −1211 | 0.978 | | −730 |

As shown in Table 1, for all Samples 1 to 8, the distortion resistance film 132 containing O as an inevitable impurity in an amount of 10 at % or less with respect to the total amount of Cr, Al, N, and O, represented by the formula $Cr_{100-x-y}Al_xN_y$, and satisfying $0.1<y\leq 20$ was obtained.

In Samples 1 to 4, the amount of Al in the distortion resistance film 132 is relatively small, and $0\leq x\leq 25$. On the other hand, in Samples 5 to 8, the amount of Al in the distortion resistance film 132 is relatively large, and $25<x\leq 50$.

Figure 4:
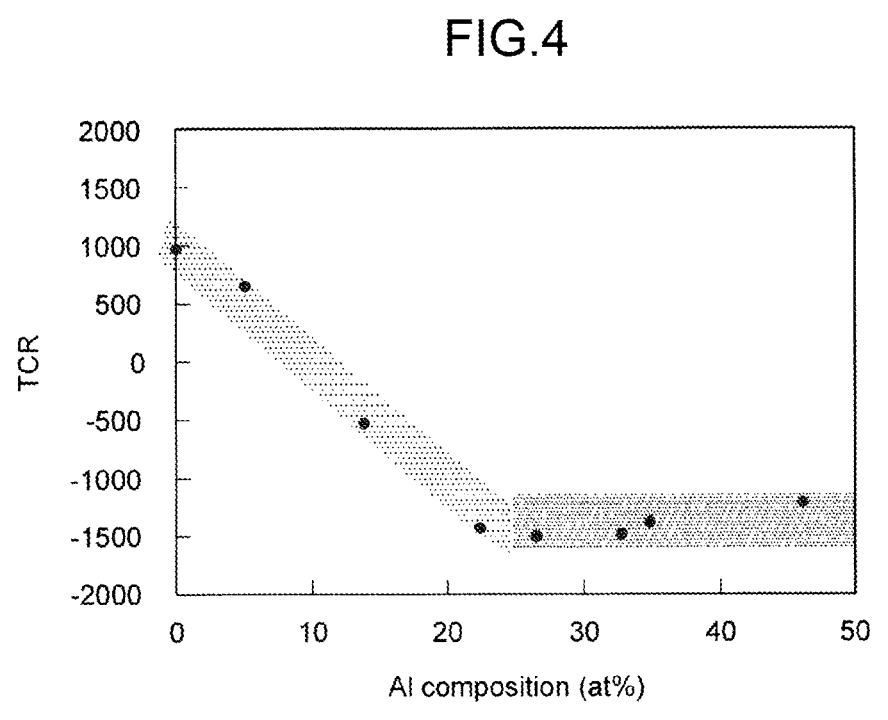

FIG. 4 is a graph plotting each sample shown in Table 1 with the TCR shown in Table 1 on a vertical axis and the Al amount on a horizontal axis. As illustrated in FIG. 4, in Samples 1 to 4 in which $0\leq x\leq 25$ and the Al amount is relatively small, the slope of the TCR associated with a change in the unit composition of Al (horizontal axis) is large, and an absolute value of the slope calculated by subjecting each plot to straight line approximation by the method of least squares is 105 (see Table 1). On the other hand, in Samples 5 to 8 in which $25<x\leq 50$ and the Al amount is relatively large, the slope of the TCR associated with a change in the unit composition of Al (horizontal axis) is small, and an absolute value of the slope calculated by subjecting each plot to straight line approximation by the method of least squares is 16 (see Table 1).

As described above, in the distortion resistance film 132 in which $25<x\leq 50$, the absolute value of the slope of TCR, which was the change in TCR accompanying the change in the unit composition of Al, was less than ⅙ with respect to the distortion resistance film 132 in which $0\leq x\leq 25$, and it was confirmed that the change in property accompanying the change in the composition could be significantly suppressed. Note that an absolute value of the TCR itself was 2000 ppm/° C. or less for all Samples 1 to 8. On the other hand, as shown in Table 1, an absolute value of TCS was more than 2000 ppm/° C. in some of the distortion resistance films 132 in which $0\leq x\leq 25$ as in Sample 2, but the absolute value of TCS was 2000 ppm/° C. or less in all the distortion resistance films 132 according to Samples 5 to 8 in which $25<x\leq 50$.

Furthermore, a value of the coefficient $R^2$ of determination calculated in the temperature range of −50° C. to 450° C. was small (linearity of the temperature and the resistance value was poor) as in Sample 2 among Samples 1 to 4 ($0\leq x\leq 25$) in which the Al amount was relatively small. However, in Samples 5 to 8 ($25<x\leq 50$) in which the Al amount was relatively high, the value was 0.8 or more in each sample, and it was confirmed that the distortion resistance film according to each sample had high linearity in the relationship between the temperature and the resistance value.

Example 2

In Example 2, in the same manner as in Example 1, nine samples having different Al (values of x) were prepared for the distortion resistance film 132 comprises a composition represented by the formula $Cr_{100-x-y}Al_xN_y$, and the composition (Al amount) of the distortion resistance film 132 and the gauge factor (k-factor) at 25° C. were measured. FIG. 5 is a graph plotting measurement results of each sample, the gauge factor on a vertical axis, and the Al amount on a horizontal axis.

As illustrated in FIG. 5, it was confirmed that the sample of $x\leq 50$ had a sufficiently large gauge factor with respect to a general metal value of 2.6, and could be suitably used as the distortion resistance film 132. On the other hand, when the Al amount is more than 50 at %, it is found that the gauge factor is less than 3, and the sensitivity of the distortion resistance film 132 is lowered.

Although the pressure sensor 10 and the distortion resistance films 32 and 132 according to the present invention have been described above with reference to the embodiment and examples, the present invention is not limited only to these embodiment and examples. It goes without saying that the present invention includes many other embodiments and modified examples in addition to the above-described embodiment and examples. For example, the pressure sensor 10 is not limited to one having the stem 20 as illustrated in FIG. 1, and may be one produced by etching a substrate, or one produced by joining, to another material, a tabular substrate on which the distortion resistance film 32 or 132 is formed. A material of the substrate may be any of a metal, a semiconductor, and an insulator, and specific examples thereof include alumina ($Al_2O_3$) in addition to Si described in Examples.

REFERENCE SIGNS LIST

10 pressure sensor
12 connection member
**12*a*** screw groove
**12*b*** flow path
14 pressing member
16 circuit substrate
20 stem
21 flange portion
22 membrane
**22*a*** inner surface
**22*b*** outer surface
32, 132 distortion resistance film
36 electrode portion
52 base insulating layer
72 intermediate wiring
152 $SiO_2$ film
122 Si substrate

The invention claimed is:

1. A distortion resistance film comprising a composition represented by a formula $Cr_{100-x-y}Al_xN_y$, wherein composition regions of x and y satisfy $25<x\leq 50$ and $0.1<y\leq 20$, respectively.

2. The distortion resistance film according to claim 1, wherein an absolute value of a temperature coefficient of resistance (TCR) is 2000 ppm/° C. or less in a temperature range of −50° C. or more and 450° C. or less.

3. The distortion resistance film according to claim 1, wherein an absolute value of a temperature coefficient of sensitivity (TCS) is 2000 ppm/° C. or less in a temperature range of −50° C. or more and 450° C. or less.

4. The distortion resistance film according to claim 1, wherein O is contained in an amount of 10 at % or less with respect to a total amount of Cr, Al, N, and O.

5. A pressure sensor comprising:

the distortion resistance film according to claim 1; and an electrode portion electrically connected to the distortion resistance film.

6. The distortion resistance film according to claim 1, wherein the composition of x satisfies $25.7\leq x\leq 46.2$.

7. A distortion resistance film comprising a composition represented by a formula $Cr_{100-x-y}Al_xN_y$, wherein composition regions of x and y satisfy $25<x\leq 50$ and $0.1<y\leq 20$, respectively, and wherein, in a case where a temperature calibration of a resistance value is performed in a low temperature region, a relationship between a temperature calibration straight line of a resistance value and a resistance temperature straight line of a distortion resistance film is 0.8 or more in a coefficient $R^2$ of determination.

8. The distortion resistance film according to claim 7, wherein the temperature calibration straight line is obtained based on the resistance values of the distortion resistance film at 25° C. and 100° C., and the resistance temperature straight line is obtained in a temperature range of −50° C. or more and 450° C. or less.

* * * * *